United States Patent [19]

Hutai et al.

[11] 4,082,338

[45] Apr. 4, 1978

[54] SHOCK ABSORBER FASHIONED AS AN ELASTOMERIC HOLLOW SPRING

[75] Inventors: Hubert Hutai, Grafenau; Wolfgang Klie, Korntal; Helmut Weisshappel, Sindelfingen, all of Germany

[73] Assignee: Daimler-Benz Aktiengesellschaft, Germany

[21] Appl. No.: 683,827

[22] Filed: May 6, 1976

[30] Foreign Application Priority Data

May 7, 1975 Germany .............................. 2520327

[51] Int. Cl.² ............................................ B61F 19/04
[52] U.S. Cl. ...................... 293/85; 267/140; 293/88
[58] Field of Search .................. 293/89, 88, 87, 85, 293/71 R, 70, 98, 1; 267/140, 141

[56] References Cited

U.S. PATENT DOCUMENTS

| 1,602,922 | 10/1926 | Midboe ............................... 293/71 R |
| 3,722,876 | 3/1973 | Schwenk ............................... 267/140 |
| 3,734,554 | 5/1973 | Schwabenlender ................... 293/88 |
| 3,857,596 | 12/1974 | Nakamura ........................ 267/140 X |

*Primary Examiner*—Galen L. Barefoot
*Assistant Examiner*—Sherman D. Basinger
*Attorney, Agent, or Firm*—Craig & Antonelli

[57] ABSTRACT

A shock absorber constructed as elastomer hollow spring which is arranged between a vehicle bumper and a fixed vehicle part, and which is supported under prestress at these parts; the shock absorber includes at its end near the vehicle a socket having an inner area abutting at the shock absorber and an outer area abutting at the inner sides of sections of the bumper which are directed inwardly of the vehicle; each outer area thereby includes friction structures supported under prestress at the inner sides of the bumper sections.

8 Claims, 1 Drawing Figure

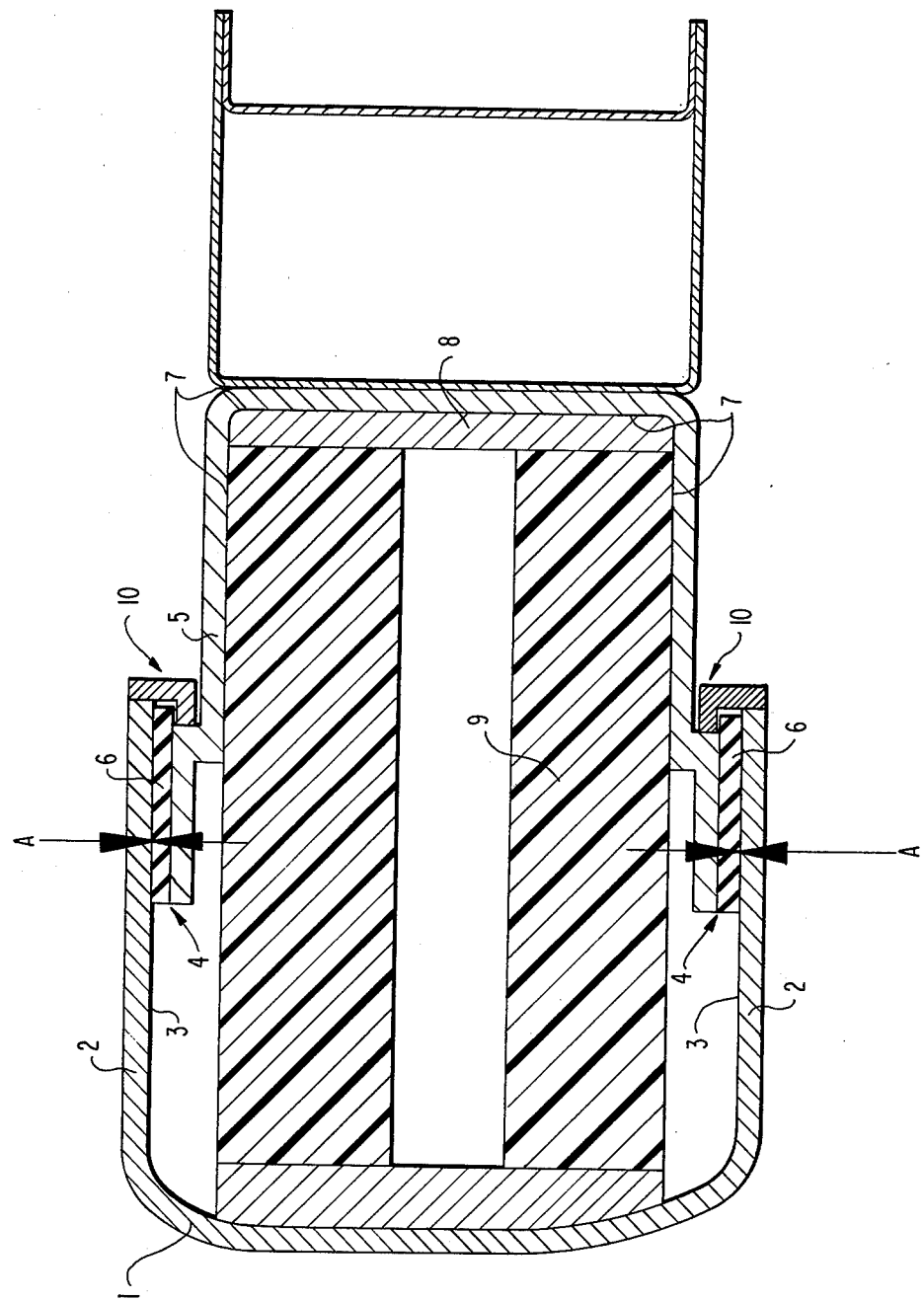

SHOCK ABSORBER FASHIONED AS AN ELASTOMERIC HOLLOW SPRING

The present invention relates to a shock absorber constructed as elastomer hollow spring, which is arranged between a vehicle bumper and a fixed vehicle part, for example, a cross bearer, and which is supported at these parts under prestress whereby the shock absorber includes at its end near the vehicle a socket including a U-shaped member whose inner area abuts at the shock absorber and whose outer area abuts at the inner sides of the inwardly directed sections of the bumper as disclosed in German Patent Offenlegungsschrift No. 2,513,589 published Oct. 7, 1976.

It is the aim of the present invention to so improve such a shock absorber fastening in a simple manner that with the same construction of the shock absorber, the absorption capability increases, while the regeneration velocity of the shock absorber is to slow down simultaneously.

Consequently, a shock absorber of the aforementioned type constructed as elastomer hollow spring is proposed whereby according to the present invention, each outer area is formed by a friction layer or friction coating which is supported under prestress at the inner sides of the vehicle inwardly directed sections of the bumper.

As a result thereof, each friction layer or coating assumes an energy absorption proportion so that altogether an increased absorption capability is achieved, or the original absorption capability can be maintained with a reduction of the structural size of the shock absorber constructed as elastomer hollow spring.

The friction coefficient can be kept constant over a desired long period of time if the friction layer or coating is covered off against the outside by an angularly bent end area of the sections which are supported with prestress at the socket.

Accordingly, it is an object of the present invention to provide a shock absorber constructed as elastomer hollow spring which avoids by simple means the aforementioned shortcomings and drawbacks encountered in the prior art.

Another object of the present invention resides in a shock absorber constructed as elastomer hollow spring which is so improved that with the same construction of the shock absorber, the absorption capability is increased while the regeneration speed of the shock absorber is simultaneously slowed down.

A further object of the present invention resides in a shock absorber of the type described above in which the original absorption capability can be maintained with a reduction of the structural size of the shock absorber or an overall increased absorption capability can be attained with the same structural size of the shock absorber.

Still a further object of the present invention resides in a shock absorber constructed as elastomer hollow spring which is interposed between the bumper and a fixed vehicle part and which is so constructed and arranged as to assure long life without service requirements.

These and further objects, features and advantages of the present invention will become more apparent from the following description when taken in connection with the accompanying drawing which shows, for purposes of illustration only, one embodiment in accordance with the present invention, and wherein:

The single FIGURE is an axial cross-sectional view through a shock absorber in accordance with the present invention.

Referring now to the single FIGURE of the drawing, a bumper 1 includes sections 2 directed inwardly toward the vehicle; the outer areas generally designated by reference numeral 4 of sockets 5 abut at the inner sides 3 of the inwardly directed sections 2. The outer areas 4 are thereby formed by friction layers or friction coatings 6 of any suitable known material which are supported with prestress (arrows A) at the inner sides 3 of the sections 2.

The inner area 7 of the socket 5 accommodates the end 8 near the vehicle of a shock absorber 9 which is constructed as elastomer hollow spring inserted with prestress. An angularly bent end area generally designated by reference numeral 10 of the sections 2 is supported thereby at the socket 5 under bias in accordance with the prestress of the elastomeric member and thus protects the friction layer 6 against outside influences.

In case of impact, the bumper 1 retracts whereby by reason of the parallel connection of the shock absorbers 9, on the one hand, and of the friction layers or coatings 6, on the other, a split-up of the energy-absorption capability occurs. After the impact, a slowed-down regeneration of the shock-absorber arrangement takes place by reason of the slowed-down return stroke braked by the friction layers 6.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. In a shock absorber arrangement which comprises at least one hollow elastomeric member being arranged between a vehicle bumper means and a fixed vehicle part, and socket means for accommodating said elastomeric member at an end facing said fixed vehicle part, wherein said socket means engages the elastomeric member, and wherein said socket means has outer surface portions abutting interior surfaces of said bumper means, the improvement comprising friction means inserted under prestress between said outer surface portions and said interior surfaces of said bumper means for effecting increased shock absorption capabilities, wherein angularly bent end means are provided at ends of said surfaces of said bumper means for covering said friction means from the outside, said angularly bent end means being supported at said socket means, and wherein said socket means includes a radially outwardly offset end portion pointing generally outwardly of the vehicle, said friction means being interposed between said offset end portion and said interior surfaces of said bumper means.

2. A shock absorber according to claim 1, characterized in that said friction means extends beyond the shoulder formed by the offset end portion in the direction toward the vehicle, and in that the angularly bent end means are substantially L-shaped with a leg portion of the L abutting against the shoulder formed by the offset end portion.

3. A shock absorber according to claim 2, characterized in that said friction means is formed by a layer of friction material.

4. A shock absorber according to claim 2, characterized in that said friction means is formed by a coating of friction material.

5. A shock absorber according to claim 2, characterized in that said fixed vehicle part is a cross bearer.

6. A shock absorber according to claim 1, characterized in that the elastomeric member is accommodated by said socket means under prestress, and the angularly bent end means at the ends of said surfaces of said bumper means are supported at said socket means under bias in accordance with the prestress of the elastomeric member.

7. A shock absorber arrangement according to claim 1, wherein said socket means holds said elastomeric member at inner surfaces of said socket means facing oppositely of said outer surface portions.

8. A shock absorber arrangement according to claim 7, wherein said socket means includes a U-shaped member enclosing said elastomeric member at least over a portion of the length of said elastomeric member.

* * * * *